United States Patent [19]

Ono

[11] Patent Number: 4,493,722
[45] Date of Patent: Jan. 15, 1985

[54] METHOD OF PRODUCING GLASS BOTTLES

[75] Inventor: Hiroyuki Ono, Nishinomiya, Japan

[73] Assignee: Yamamura Glass Co., Ltd., Nishinomiya, Japan

[21] Appl. No.: 411,186

[22] Filed: Aug. 25, 1982

[30] Foreign Application Priority Data

Sep. 8, 1981 [JP] Japan .................. 56-141869

[51] Int. Cl.³ .................. C03C 21/00; C03B 9/193
[52] U.S. Cl. .................. 65/30.14; 65/72; 65/79; 65/232; 65/308
[58] Field of Search .................. 65/79, 308, 319, 229, 65/232, 72, 68, 30.14

[56] References Cited

U.S. PATENT DOCUMENTS 3,047,982 8/1962 Olson .................. 65/232 X
3,498,773 3/1970 Grubb et al. .................. 65/30.14
3,725,028 4/1973 Cramer .................. 65/29 X

OTHER PUBLICATIONS

The Handbook of Glass Manufacture, vol. II, F. Tuley, Editor, 1974, pp. 610–615.
Glass Machines, W. Giegerich and W. Trier, Editors, 1969, pp. 282–295.

Primary Examiner—Kenneth M. Schor
Attorney, Agent, or Firm—Millen & White

[57] ABSTRACT

A method and apparatus for producing glass bottles, is characterized by the forming of an air curtain to cover a plunger of the apparatus so as to prevent foreign matter from adhering to the plunger, a phenomenon which is the cause of decreasing the impact strength of glass bottles and which, therefore, makes it difficult to produce thin-walled glass bottles.

8 Claims, 4 Drawing Figures

METHOD OF PRODUCING GLASS BOTTLES

BACKGROUND OF THE INVENTION

The present invention relates to a production method for improving the mechanical properties of glass bottles.

Methods of producing glass bottles are classified into two types, the blow and blow process (B-B process), and the press and blow process (P-B process). Recently, P-B process, which is capable of producing glass bottles having a uniform distribution of glass material, has become employed in the production of all kinds of bottles and has become an important method of producing lightweight bottles. Production of lightweight bottles by P-B process, however, is likely to lower the impact strength of said bottles to the extent that the glass bottles on the conveyor, such as in the usual filling line, crack or break, causing various troubles.

For this reason, a method has been employed of sorting out glass bottles by a squeeze tester to discard glass bottles of low impact strength in advance from the viewpoint that the impact strength of trouble-prone glass bottles is generally in the neighborhood of 1 Kg-cm, although depending on the bottle weight and on the conveyor speed. This method, however, does not increase the percent pack of lightweight bottles.

On the other hand, an effort has been made to increase the impact strength by applying a chemical treatment to the inner and outer surfaces of glass bottles produced by P-B process, but this approach has not been successful in providing the sufficient impact strength.

My careful study on the problem of decrease of the impact strength of glass bottles produced by P-B process has revealed that foreign matter adhering to the plunger fitted in the blank mold is a cause of the degradation of mechanical properties. More particularly, a form of graphite consisting mainly of carbon powder which forms when an oily mold release agent consisting mainly of graphite applied to the bottle forming mold (blank mold, neck ring mold) is burnt at high temperature, and other various dusts including glass powder and iron powder floating in the atmosphere around the bottle forming machine adhere to the plunger, thus scratching the inner surface of the glass bottle during the formation of a parison or adhering to the inner surface of the bottle, and then entering the glass material to exert an adverse influence on the mechanical properties of the glass bottle. With this in mind, I have found that the strength, particularly impact strength of glass bottles, can be increased by preventing foreign matter from adhering to the plunger.

SUMMARY OF THE INVENTION

Accordingly, an object of the present invention is to provide a method of producing glass bottles having improved mechanical strength, particularly impact strength, by using a P-B process.

The invention provides a method of producing glass bottles including bottle forming steps based on the usual P-B process, i.e., the steps of feeding a molten glass mass (gob) into a blank mold, press-molding it into a parison by a plunger, and inverting said parison and transferring the latter to a blow mold for blow-molding the same. The method is characterized by forming an air curtain to cover the plunger for any desired period of time selected intermediate between the parison inverting step and the blank mold closing step, thereby preventing foreign matter from adhering to the plunger.

The blowing of said gas to cover the plunger may be effected by forming a number of gas blowing holes or slits circumferentially in a cap mounted on the upper end of the upper portion of a plunger actuator, and feeding a blow gas at a constant pressure to these holes through a switching valve, such as a solenoid valve or an air valve, (normally closed and actuated to be opened or normally open and actuated to be closed by a signal).

The solenoid valve, air valve or other switching valve is actuated (to be opened or closed) by a suitable signal from a valve block which controls the operation of the glassware forming machine, thereby blowing the gas to cover the plunger, and forming an air curtain. The "air curtain" mentioned herein refers to a flow of gas to cover the plunger, formed by blowing air, nitrogen or any other suitable gas.

The timing for blowing the gas can be optionally set within a range not interfering with the glass bottle production, e.g., intermediate between the invert and the blank mold closure. The gas may be air, nitrogen or any other gas provided it is capable of forming a gas curtain flow to cover said plunger.

DESCRIPTION OF THE PERFERRED EMBODIMENT

Figure 1:
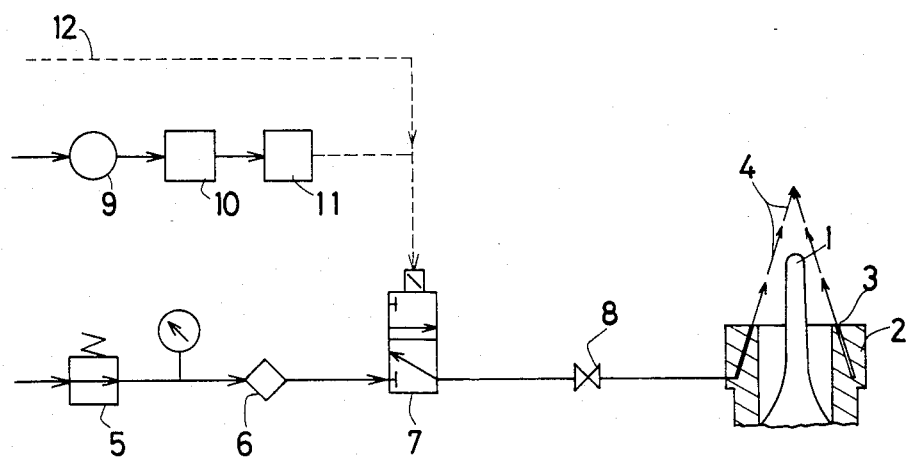
FIGS. 1 and 2 are schematic views of an example of an apparatus for embodying the present inventive method.
Figure 2:
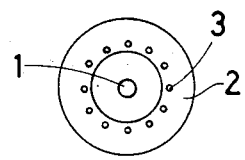

Referring to the drawings, 1 denotes a plunger surrounded by a cap 2 mounted on the upper end of the upper portion of a plunger actuator. The upper end surface of the cap 2 is circumferentially provided with a number (e.g., 24) of air blowing holes 3. They may be replaced by a continuous annular slit. The blowing holes 3 are inclined toward the centerline of the cap 2 so as to form a conical air curtain 4 to cover the plunger 1. The air to be supplied to the blowing holes 3 comes from a suitable supply source and passes successively through a pressure reducing valve 5 for pressure reduction e.g., from about 1.5 Kg/cm$^2$ to about 1.1 Kg/cm$^2$, a filter 6 for purification, a solenoid valve 7, and a pressure regulating valve 8, whereupon it enters a manifold 13 shown in FIG. 3 and is blown through the blowing holes 3 to form the air curtain 4. The solenoid valve 7 is of the pilot operated type. As soon as the parison starts to invert in response to an invert start signal from a valve block a pressure switch 9 is turned on to give a first timer 10 an electric signal, which is transferred with a suitable time lag to a second timer 11 by said first timer 10, so that the solenoid valve 7 is kept open during the time set by the second timer 11. That is, said instruction is one to form the air curtain 4 covering the plunger 1, and the first timer 10 is used to set a period of time selected intermediate between the start of invert and the start of air blowing; practically, it is set to a predetermined period of time (about 0.1–0.3 seconds) from the start of invert operation to approximately the intermediate point of said operation. At the same time as the deactivation of the first timer 10, the second timer 11 is activated to control the air blow duration time; practically, it is set to a period of time (about 2-3 seconds) from approximately the intermediate position of the invert until the neck ring mold is reverted and the blank mold closed. As a result, the opening operation of the solenoid 7, or the formation of the air curtain 4, can be set to any desired period of time selected intermediate between the invert step and the blank mold closing step by suitably changing the setting times for the timers 10 and 11. Further, a separate pilot line 12 may be provided for enabling the solenoid valve or air valve 7 to be activated by a signal other than the aforesaid invert signal.

The present invention prevents foreign matter from sticking to the plunger by forming the air curtain 4 to cover the plunger during production of glass bottles according to P-B process. The formation of the air curtain 4 is effected for any desired period of time selected intermediate between the invert step where the plunger 1 is in a lower position and the blank mold closing step; usually, it is set to a period of time from approximately the intermediate position of the invert to the blank mold closing. Such a period of time will never cause the gas from the blowing holes 3 to interfere with the production of the glass bottle. In this connection, it is to be noted that in early stages of the invert, the parison is still located in close vicinity to the blank mold; thus, forming the air curtain 4 in such stages would bring the gas into contact with the parison, causing excessive bulging of the parison or its excessive cooling and hardening, which is undesirable to the finish of the glass bottle. On the other hand, blowing the gas until the blank mold closing would result in the gas blowing against the plunger 1, which has been lifted to the gob charging position, thus causing the excessive cooling or local cooling of the plunger, which is undesirable to the subsequent processing of the parison. Further, blow gas would stay in the blank mold to form an air pocket, so that there is a danger that the gob, when charged, will not sufficiently spread to fill the blank mold. Although the formation of the air curtain is required to prevent foreign matter from adhering to the plunger 1 and to prevent the gas from hitting the plunger, more or less blowing of the gas against the plunger is permitted provided it does not cause excessive or local cooling of the plunger.

Figure 3:
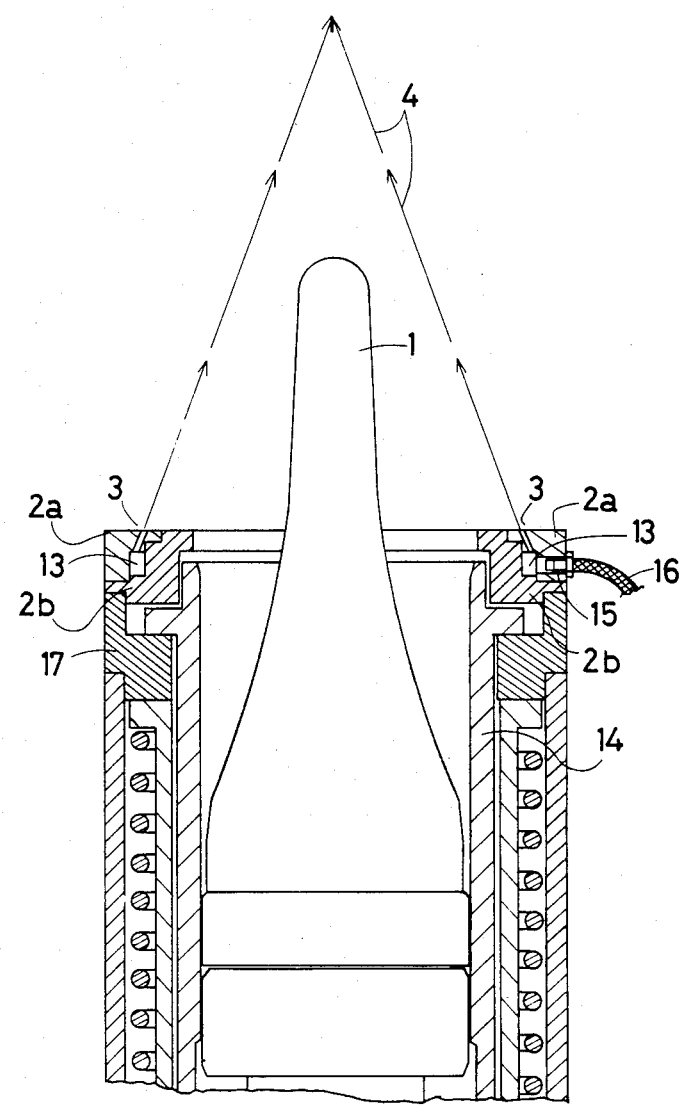
FIG. 3 is a fragmentary section showing a plunger and a plunger positioner.
Figure 4:
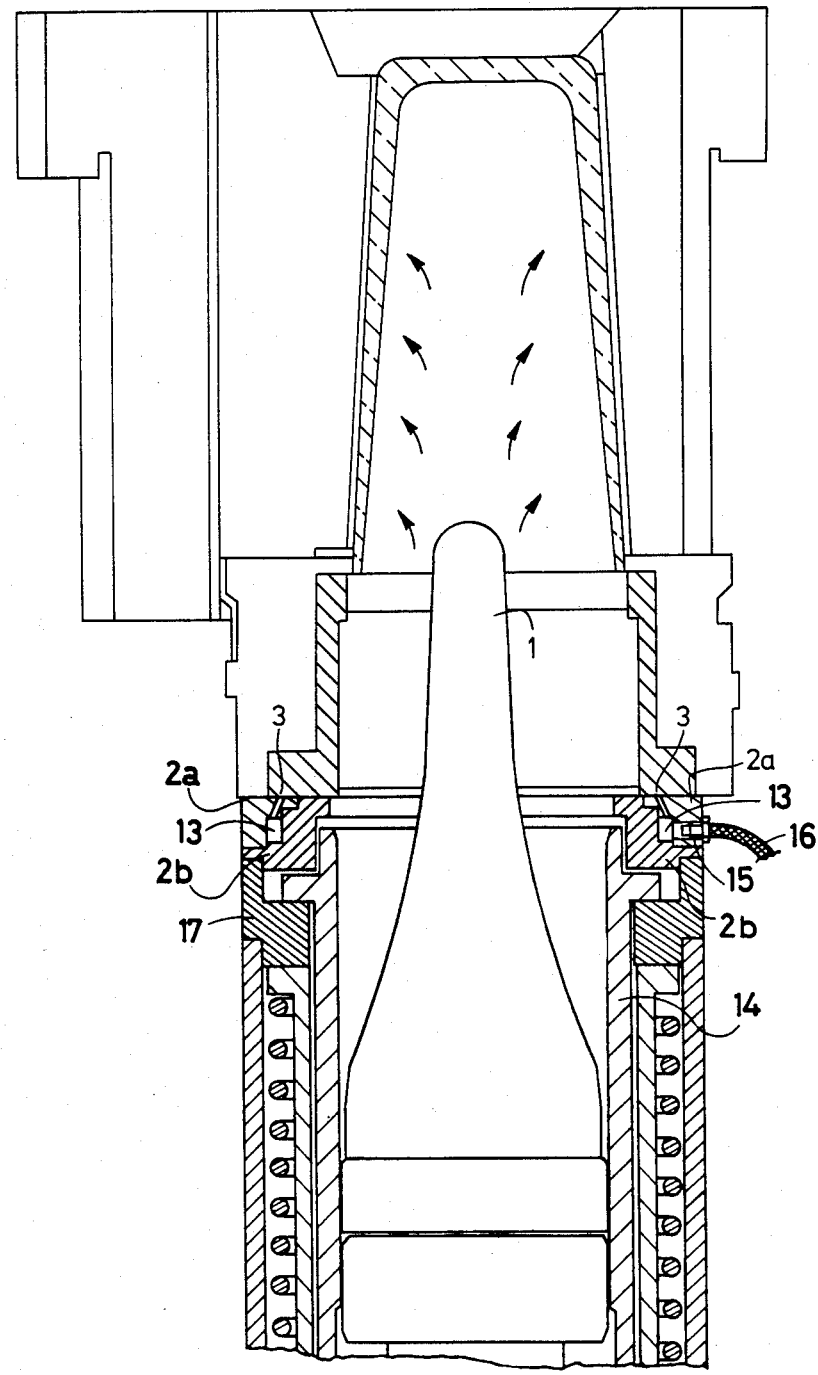
FIG. 4 is a view of the plunger, plunger positioner, and a blank mold containing glass.

FIG. 3 is a sectional view showing the plunger and a plunger positioner. They are of usual construction except for the blowing holes or slits 3 formed in the upper edge of the cap 2 for forming the air curtain 4. The cap 2 comprises an upper cap 2a and a lower cap 2b, with an annular manifold 13 provided therebetween along the junction surface. A gas passageway 15 extends radially outwardly from said manifold 13 through the upper cap 2a for communication with the outside. A hose 16 is connected at one end thereof to said gas passageway 15 and at the other end to the downstream side of the pressure regulating valve 8 in FIG. 1. The plunger 1 moves up and down along a plunger guide 14, and the cap 2 is supported on top of the remainder of the plunger positioner by a spacer 17 and by said plunger guide 14.

In the above concrete example the blowing holes 3 are provided in the cap 2 on the upper end of the plunger actuator, but the invention is not limited thereto; it is possible to provide blow nozzles in close vicinity to the outer periphery of the cap 2 to blow the gas or, alternatively, to utilize the conventional plunger exterior cooling air to blow the gas from the upper end of the plunger guide 14 so as to form an air curtain. Thus, any means may be used so far as it provides a method of forming an air curtain covering the plunger.

The present inventive method prevents foreign matter from adhering to the plunger 1 to improve the mechanical properties, particularly impact strength of glass bottles and can be combined with other various strength-increasing treating methods. For example, it may be combined with a method of forming a compressive stress surface layer by replacing the Na ions in glass by ions (e.g., K ions) having greater radii than said ions. When it is combined with such chemical strengthening method, the mechanical properties, particularly the lowest value of impact strength, are considerably improved. In our experiments, the impact strength of glass bottles increased from 1 Kg-cm to 3 Kg-cm, whereby the trouble of breakage of bottles on the conveyor, such as the filling line, was eliminated and the break percentage by the squeeze tester decreased, thus contributing to increasing the percent pack. Further, if the inner surface of the glass bottle is subjected to the usual dealkalization treatment of fluorine treatment, this will substantially increase the impact strength as well as improve the chemical durability or endurance of the inner bottle surface.

Further, to protect the formed glass bottle against scratching during handling thereof, metal oxide coating, or so-called hot end coating, which is performed in glass bottle making is preferable. In this method, for example, stannic tetrachloride vapor is applied to the outer surface of the glass bottle for thermal decomposition to form a tin oxide coating on said surface. The tin oxide coating protects the glass bottle against scratching when they contact each other or other objects during handling of the bottle, so that it is effective as a abrasion-resistant coating. In addition to this, application of an organic coating, or so-called cold end coating, is more preferable. This method is to apply a lubricant to the glass bottle after the latter has been sufficiently annealed and cooled. For example, a nonionic surface active agent is sprayed to give lubricity and abrasion resistance to the outer glass bottle surface. Such lubricants applicable include polyolefine waxes of low molecular weight, such as polyethylene and polypropylene, ionomer (tradename: SURLYN), and paraffin.

The air curtain formed above the plunger according to the invention protects the plunger against foreign matter, such as carbon powder, iron powder, and glass powder, adhering thereto, and glass bottles obtained thereby have an impact strength increase of as high as 40%. Since the plunger is protected against contamination, its life is greatly prolonged. While efforts are being made to make glass bottles lighter in weight to meet recent requirements for material- and energy-saving, it is a great merit of the invention that it compensates for the degradation of the mechanical properties, particularly impact strength, of glass bottles due to this lightweight orientation. Further, if the method of the invention is combined with known chemical treating methods, the effects of the air curtain formation and the effects of the chemical treating methods are synergistically enhanced to provide further improved mechanical properties of glass bottles, a fact which is particularly desirable from the standpoint of percent pack in connection with the production of lightweight strengthened bottles and super-lightweight bottles.

The invention will now be described with reference to examples thereof.

EXAMPLE 1

A molten mass of usual soda lime-silicate glass was charged into a blank mold by using an IS machine (individual section machine) to produce a glass bottle in accordance with the usual glass making process and by using the process shown in FIG. 1. The air from a compressed air source was at about 1.5 Kg/cm$^2$, which was reduced to about 1.1 Kg/cm$^2$ by the pressure reducing valve 5, and an air curtain was formed by blowing the air through the blowing holes 3 by opening the solenoid valve 7 from the time of intermediate invert positioning until the time the blank mold was closed, thereby blowing the air to form an air curtain 4. The parison transferred to the blow mold was blown into a final shape through the blow head after the lapse of a predetermined reheat time. The thus finished glass bottle was transferred onto a dead plate by a take-out device, and upon sufficient cooling it was pushed onto a conveyor for transfer to the usual annealing lehr. On its way to the annealing lehr, the glass bottle still at a high temperature received stannic tetrachloride vapor to have a tin oxide coating formed on its surface. After this hot end coating, the glass bottle was passed through the annealing oven and thereby sufficiently annealed, and then at the lehr end it was spray-coated with a nonionic surface active agent. This is the cold end coating. In this manner, there was produced a 500 ml lightweight bottle (having a weight of 190 g and a wall thickness of about 1.5 mm) with a diameter of 74.2 mm and a height of 182 mm.

To ascertain the effects of air curtain formation, bottles were produced with and without an air curtain in two series each comprising 9 lots of 20 sample bottles. In addition, the air curtain forming time and non-forming time were 1.5 hours at a minimum and 24 hour at a maximum. The impact strength tests of the sample bottles were conducted by the method specified by JIS S2303. The impact position was 125 mm above the bottle bottom (contact point). The test results are shown in Table 1.

TABLE 1

| Impact strength (Kg-cm) | Embodiment (with air curtain) | | | Control (without air curtain) | | |
|---|---|---|---|---|---|---|
| | Number of bottles broken | Cumulative | Break percentage (%) | Number of bottles broken | Cumulative | Break percentage (%) |
| 1 | 1 | 1 | 0.6 | 4 | 4 | 2.2 |
| 2 | 4 | 5 | 2.8 | 14 | 18 | 10.0 |
| 3 | 13 | 18 | 10.0 | 26 | 44 | 24.4 |
| 4 | 19 | 37 | 20.6 | 33 | 77 | 42.8 |
| 5 | 30 | 67 | 37.2 | 34 | 111 | 61.7 |
| 6 | 20 | 87 | 48.3 | 20 | 131 | 72.8 |
| 7 | 13 | 100 | 55.6 | 20 | 151 | 83.9 |
| 8 | 24 | 124 | 68.9 | 14 | 165 | 91.7 |
| 9 | 15 | 139 | 77.2 | 6 | 171 | 95.0 |
| 10 | 11 | 150 | 83.3 | 4 | 175 | 97.2 |
| 11 | 6 | 156 | 86.7 | 3 | 178 | 98.9 |
| 12 | 11 | 167 | 92.8 | 2 | 180 | 100 |
| 13 | 2 | 169 | 93.9 | | | |
| 14 | 5 | 174 | 96.7 | | | |
| 15 | 3 | 177 | 98.3 | | | |
| 16 | — | — | — | | | |
| 17 | 1 | 178 | 98.9 | | | |
| 18 | 1 | 179 | 99.4 | | | |
| 19 | 1 | 180 | 100 | | | |
| Average | 7.3 Kg-cm | | | 5.2 Kg-cm | | |
| Maximum | 19.0 Kg-cm | | | 12.0 Kg-cm | | |
| Minimum | 1.0 kg-cm (1 bottle) | | | 1.0 kg-cm (4 bottles) | | |

As described above, the average impact strength is 7.3 Kg-cm when an air curtain is formed and 5.2 Kg-cm when it is not formed, which means that it is increased about 1.4 times, an increase percentage of as high as 40%. Further, the number of bottles broken at minimum impact strength of 1 Kg-cm is 1 among 180 bottles (0.6%) when an air curtain was formed and 4 among 180 bottles (2.2%) when it is not formed. These results prove that the method of the present invention has the effect of increasing the impact strength of glass bottles.

EXAMPLE 2

Visual inspection was conducted to examine the degree of contamination of the plunger when an air curtain was formed. For comparison purposes, the same inspection was conducted to examine the contamination of the plunger of the conventional apparatus. The results are shown in Table 2.

TABLE 2

| | Time of use (hr) | Contamination of front end | Contamination of intermediate portion | Contamination of rear end |
|---|---|---|---|---|
| Air curtain formed | 23 | A | A | A |
| | 47 | A | B | B |
| No air curtain formed | 23 | B | B | B |
| | 47 | B | B | C |

(Note)
The plunger had a flame spray coating.
Assessment A: low contamination.
B: high contamination.
C: maximum contamination.

From Table 2 it will be seen that the formation of an air curtain ensures that even prolonged use causes much less contamination of the plunger than in the conventional arrangement and that, therefore, the plunger life is correspondingly increased. Further, it is clear that the fact of this less contamination contributes to increasing the impact strength of glass bottles.

What is claimed is:

1. In a method of producing glass bottles including the steps of feeding a molten glass mass or gob into a blank mold while the blank mold substantially encloses the plunger to provide a substantially closed position, press-molding said gob with a plunger by advancing the plunger into the gob to form a parison, retracting the plunger from the parison, opening the blank mold and inverting said parison for transfer to a blow mold in which it is blown for molding and closing the blank mold into said closed position, the improvement comprising forming an air curtain to enclose the entire plunger within said air curtain for a period of time beginning in the later stages of inverting said formed parison and continuing until blank mold closing without impinging upon said formed parison with said air curtain, thereby preventing foreign matter from adhering to the plunger.

2. A method as in claim 1, wherein to further increase the mechanical strength of glass bottles, said method is combined with a method of forming a compressive stress surface layer by replacing the Na ions in the glass by ions having greater radii than said Na ions.

3. A method as in claim 1 wherein the air curtain is formed by an air flow at a pressure sufficient to prevent foreign matter from passing through said air curtain to adhere to the plunger.

4. A method as in claim 1 wherein said air curtain is formed by blowing air from a plurality of individual nozzles arranged to define an annular ring around the plunger.

5. A method as in claim 1 wherein said air curtain is formed by blowing air from a continuous annular slit around the plunger.

6. A method as in claim 1 wherein the air pressure of the air curtain is maintained at about 1.1 Kg/cm$^2$.

7. A method as in claim 6 wherein the air pressure is regulated and maintained within a predetermined pressure by means of a pressure reducing valve, and with pressurized air being supplied to said pressure reducing valve at a pressure higher than that of the air curtain produced.

8. A method as in claim 1 wherein said air curtain is produced at predetermined time intervals for predetermined amounts of time.

* * * * *